(12) United States Patent
Wood

(10) Patent No.: US 8,096,058 B2
(45) Date of Patent: Jan. 17, 2012

(54) MEASURING DEVICE

(76) Inventor: Paul Thomas Wood, Mandeville, LA (US)

(*) Notice: Subject to any disclaimer, the term of this patent is extended or adjusted under 35 U.S.C. 154(b) by 0 days.

(21) Appl. No.: 12/840,339

(22) Filed: Jul. 21, 2010

(65) Prior Publication Data

US 2010/0281704 A1 Nov. 11, 2010

Related U.S. Application Data

(63) Continuation-in-part of application No. 12/247,089, filed on Oct. 7, 2008, now abandoned.

(51) Int. Cl.
*B43L 7/00* (2006.01)
*G01B 3/04* (2006.01)

(52) U.S. Cl. ......................................................... 33/483

(58) Field of Classification Search ............. 33/483, 33/485, 492, 493, 494
See application file for complete search history.

(56) References Cited

U.S. PATENT DOCUMENTS

| | | | | |
|---|---|---|---|---|
| 1,396,806 A * | 11/1921 | Beals | ............................... | 33/485 |
| 1,773,899 A * | 8/1930 | Kaler | ............................... | 33/485 |
| 2,438,653 A * | 3/1948 | Ware | ............................... | 33/483 |
| 3,465,453 A * | 9/1969 | Scanga | ........................... | 33/483 |
| 4,089,116 A * | 5/1978 | Bearinger | ..................... | 33/485 |
| 4,495,709 A * | 1/1985 | Mainenti | ....................... | 33/485 |
| 5,881,469 A * | 3/1999 | Monck | ............................ | 33/494 |
| 2002/0166250 A1* | 11/2002 | Jimenez et al. | ................ | 33/483 |
| 2010/0083515 A1* | 4/2010 | Wood | ............................ | 33/483 |

* cited by examiner

*Primary Examiner* — G. Bradley Bennett
(74) *Attorney, Agent, or Firm* — Dale J. Ream

(57) ABSTRACT

A measuring device includes at least three elongate sides, each side having first and second ends and a pair of outer edges extending therebetween. Each side includes a channel extending between the first and second ends at each outer edge. The measuring device includes a plurality of strips, the quantity of strips being at least as great as the quantity of all the channels. Each strip includes scaled indicia that is different from scaled indicia of every other strip. A respective strip is removably positioned in each of the channels such that each side has two of the strips offset 180 degrees away from each other. Each side is transparent to allow the scaled indicia of the strips in the channels to be viewed.

19 Claims, 7 Drawing Sheets

US 8,096,058 B2

MEASURING DEVICE

CROSS REFERENCE TO RELATED APPLICATIONS

The present application is a Continuation-In-Part of U.S. patent application Ser. No. 12/247,089, filed Oct. 7, 2008 now abandoned, titled "PT Ruler," and also claims the benefit of *Patent Cooperation Treaty Application No. PCT/US09/56943, filed Sep. 15, 2009, titled "PT Ruler," the disclosure of which is incorporated herein by reference.

BACKGROUND OF THE INVENTION

This invention relates generally to measuring devices and, more particularly, to a triangular shaped architectural ruler that is configured for easy viewing, improved grouping of scales, and improved font and color of scales.

Traditional triangular architectural rulers have the following characteristics:

VIEW: Traditional triangular architectural rules are designed to be viewed as in FIG. 4a of the accompanying drawings such that the scale being viewed is the scale that is the furthest away from the person viewing the scale. If lines are drawn with this ruler, they are drawn using the side of the ruler furthest from the person viewing.

SCALE ARRANGEMENT: The scales are arranged so that similar scales are on one side of the ruler. So the ⅛", ¼", ½", and 1" scales are on one of the triangular sides, the 3/32", 3/16", and 16" scales are on another one of the triangular sides, and the ⅜", ¾", 1½", and 3" scales are on the final triangular side.

SCALE COLOR: The color of the scales is typically black, with each of the triangular sides' mid section being colored, or with each of the three triangular sides being the same color.

SCALE FONT: The font size of each of the scales is typically the same for each scale.

Although assumably effective for their intended purposes, the present devices and proposals do not provide a measuring device that is easy to view or that provides distinguishing characteristics that improve efficiency, user-friendly use, and minimize errors.

Therefore, it would be desirable to have a measuring device that provides a comfortable view angle as well as configurations and indicia that promote efficiency, user-friendliness, and error reduction. Further, it would be desirable to have a measuring device in which strips of scaled indicia may be inserted or removed as desired.

SUMMARY OF THE INVENTION

A measuring device according to the present invention includes at least three elongate sides, each side having first and second ends and a pair of outer edges extending therebetween. Each side includes a channel extending between the first and second ends at each outer edge. The measuring device includes a plurality of strips, the quantity of strips being at least as great as the quantity of all the channels. Each strip includes scaled indicia that is different from scaled indicia of every other strip. A respective strip is removably positioned in each of the channels such that each side has two of the strips offset 180 degrees away from each other. Each side is transparent to allow the scaled indicia of the strips in the channels to be viewed.

Therefore, a general object of this invention is to provide a measuring device having a configuration that is angled for easy viewing.

Another object of this invention is to provide a measuring device, as aforesaid, having at least three sides, each having a channel extending between first and second ends.

Still another object of this invention is to provide a measuring device, as aforesaid, having a plurality of strips, each strip having scaled indicia and configured for removable insertion in a respective channel.

Yet another object of this invention is to provide a measuring device, as aforesaid, in which each strip includes a color different from a color of every other strip.

A further object of this invention is to provide a measuring device, as aforesaid, in which each strip includes at least two different font sizes.

A still further object of this invention is to provide a measuring device, as aforesaid, wherein each side has two portions separated by a groove and angled relative to one another.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an isolated view on an enlarged scale taken from a portion of FIG. 1a;

FIG. 2 is an end view of the measuring device as in FIG. 1a;

FIG. 3 is a perspective view of a removable strip of scaled indicia as in FIG. 1a;

FIG. 7b is an isolated view on an enlarged scale taken from a portion of FIG. 7a;

FIG. 8 is an end view of the measuring device as in FIG. 7a; and

FIG. 9 is an exploded view of a scaled indicia strip taken from FIG. 7a.

DESCRIPTION OF THE PREFERRED EMBODIMENT

Figure 1A:
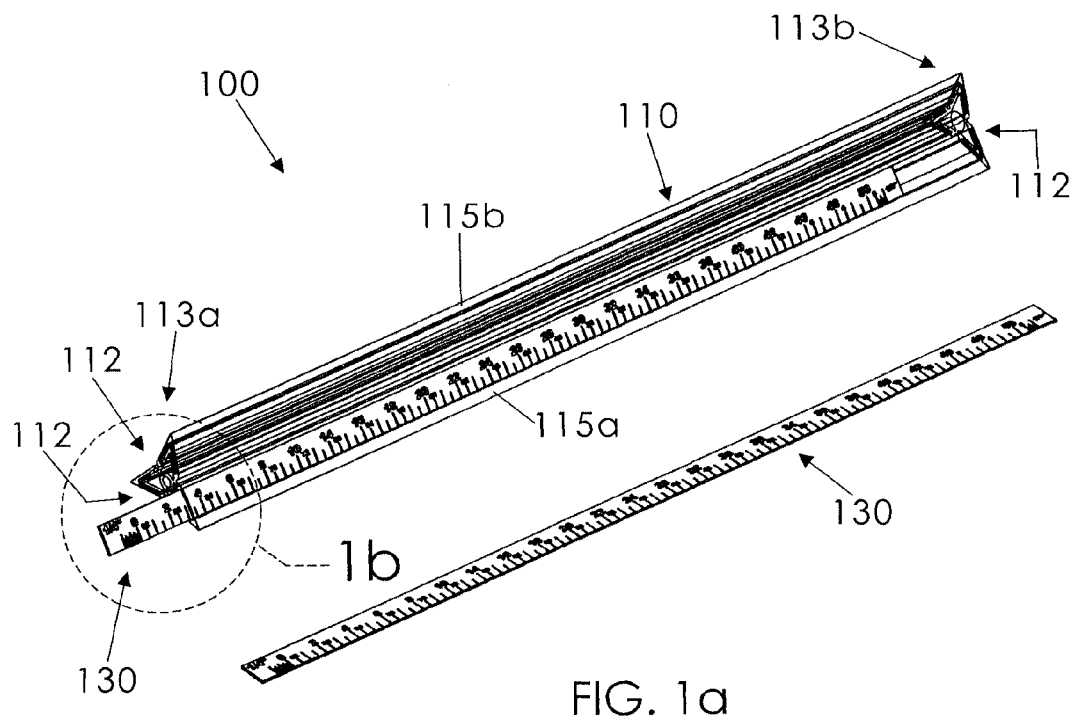
FIG. 1a is a perspective view of a measuring device according to one embodiment of the present invention.
Figure 1B:
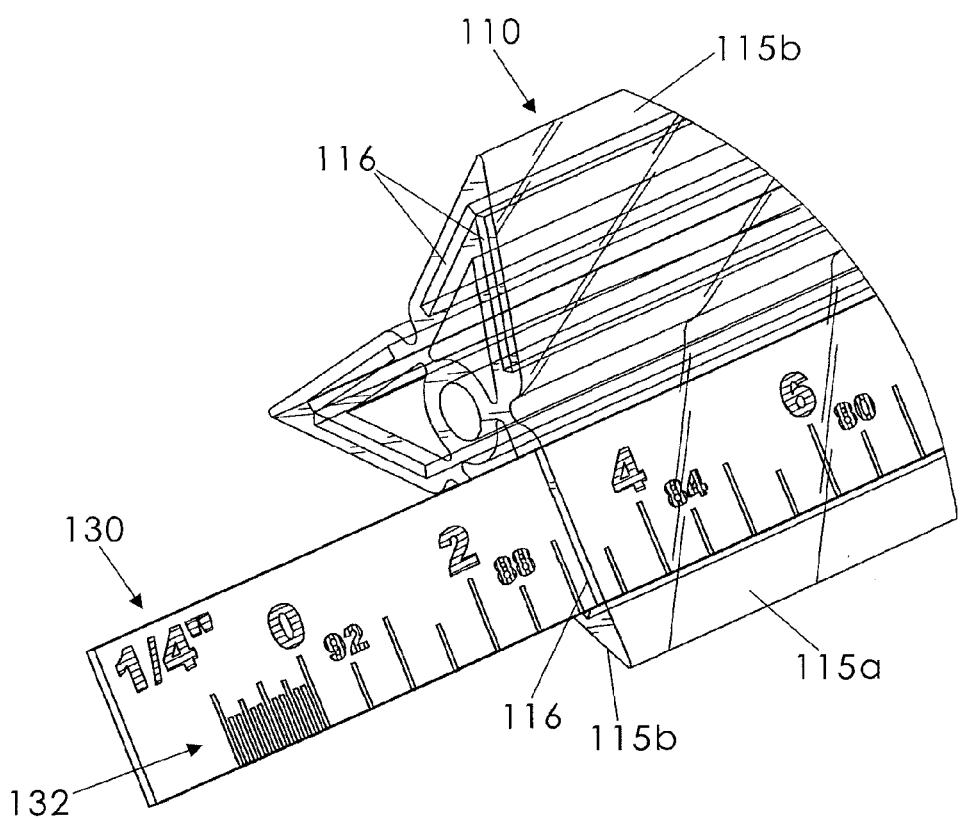

Measuring devices according to the present invention will now be described in detail with reference to FIGS. 1a through 9 of the accompanying drawings. More particularly, a measuring device 100 according to one embodiment (FIGS. 1a through 6) includes at least three elongate sides 112 and scaled indicia 132.

The sides 112 may be part of a unitary transparent housing 110 (FIG. 1a and FIG. 2) that further has a central axis 111 and first and second ends 113a, 113b. The elongate sides 112 are spaced about and touch the central axis 111, and each side 112 has a pair of outer edges 115a, 115b extending between the ends 113a, 113b. An outer edge 115a, 115b of each side is adjacent an outer edge 115a, 115b of another respective side 112, and each side 112 has a channel 116 extending from the first end 113a toward the second end 113b adjacent each outer edge 115a, 115b. In some embodiments, the entire housing 110 is transparent. But, alternately, just the sides 112 may be transparent, or at least portions of the sides 112 allowing the channels 116 to be viewed may be transparent.

Figure 2:
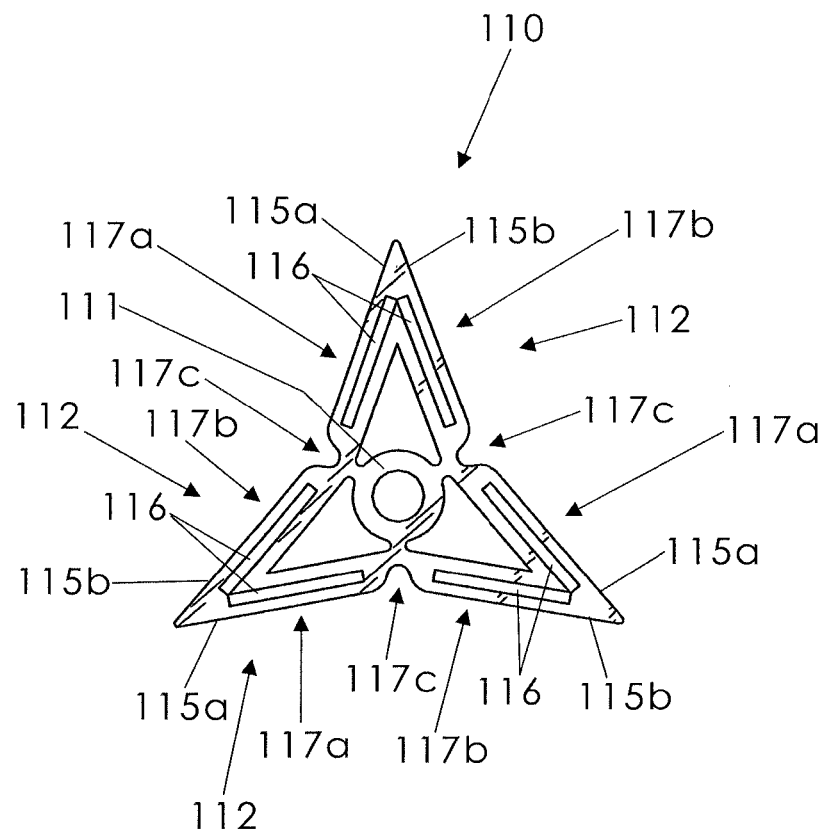
Figure 8:
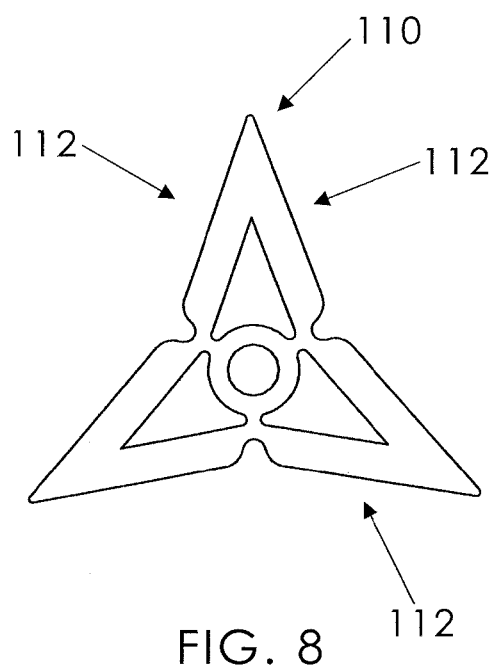
Figure 3:
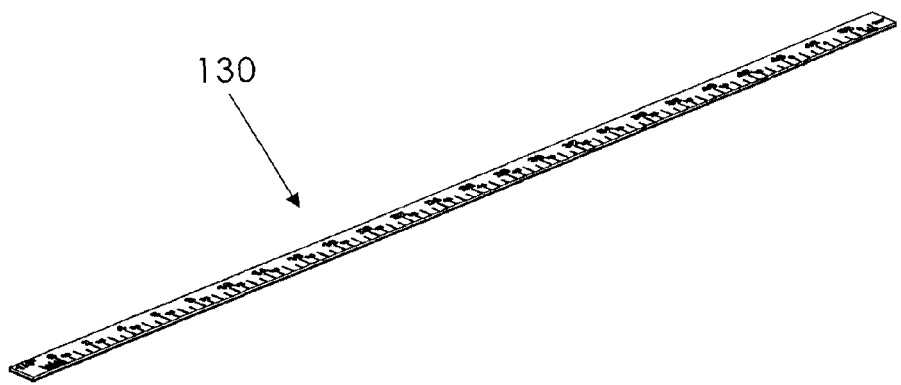
Figure 9:
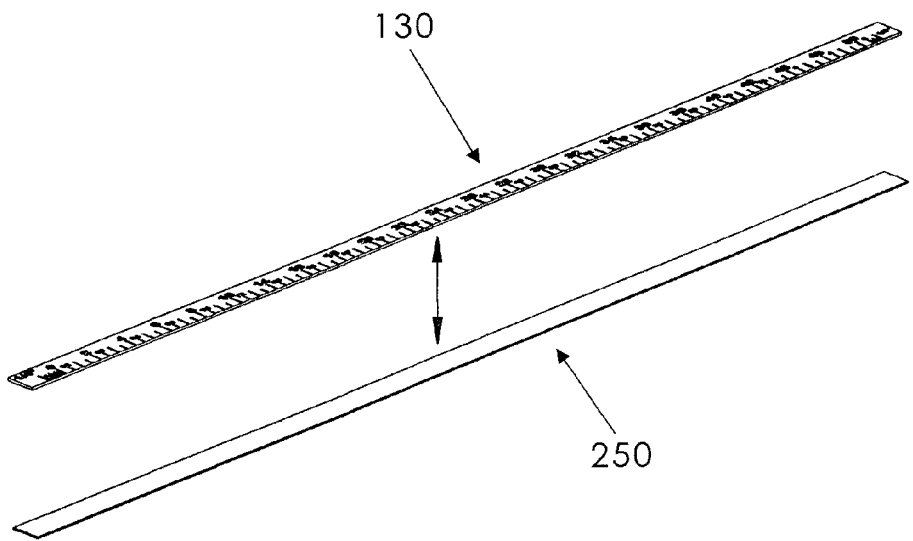
Figure 4A:
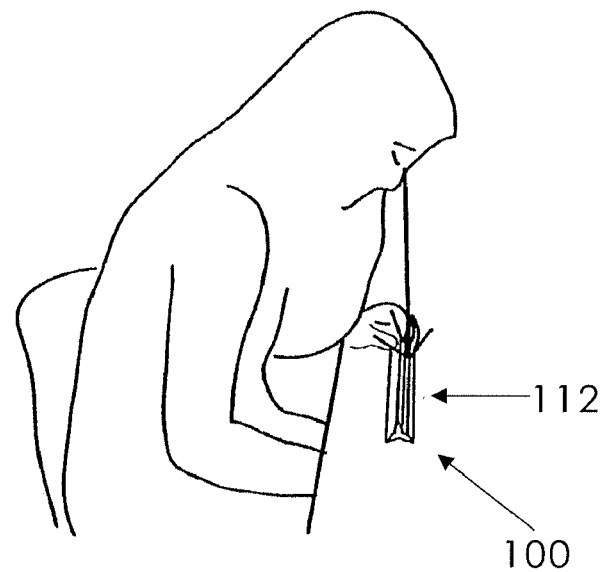
FIG. 4a is an illustration of a view angle when using a measuring device of the Prior Art.
Figure 4B:
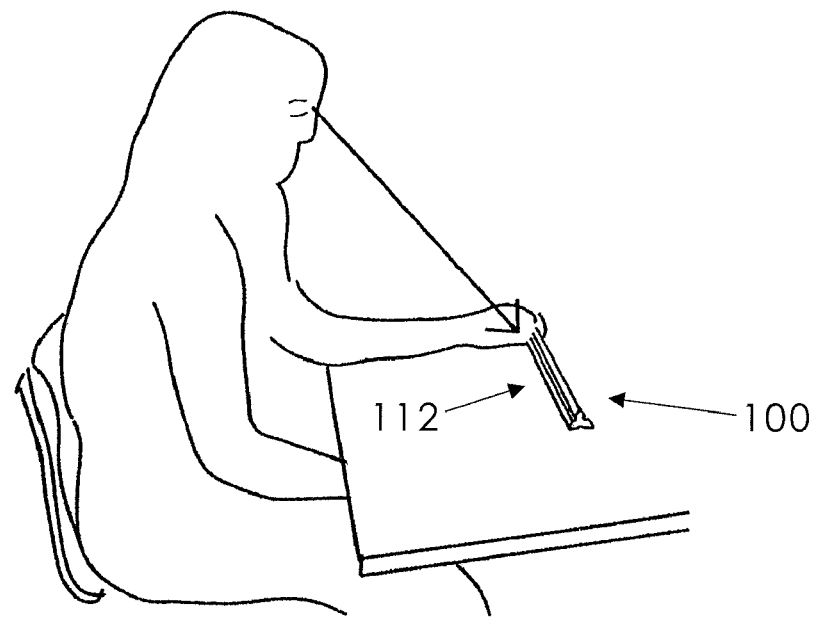
FIG. 4b is an illustration of a view angle when using the measuring device of FIG. 1.

As shown in FIG. 2, each side 112 may have two portions 117a, 117b angled inwardly toward the central axis 111, and a groove 117c may separate the portions 117a, 117b. In other words, the portions 117a, 117b may be angled such that the grooves 117c are relatively adjacent the central axis 111 (when compared to if the portions 117a, 117b were co-planar).

Figure 5A:
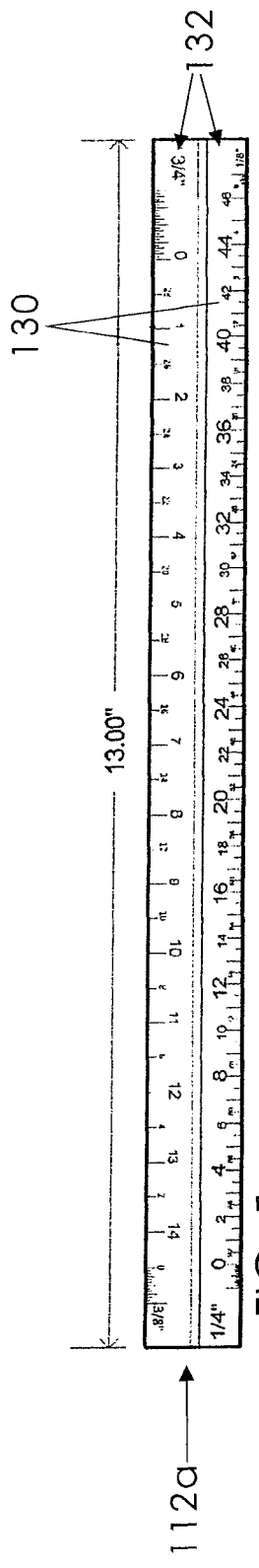
FIG. 5a is a top view of the measuring device as in FIG. 1a oriented to illustrate use of one particular font size.
Figure 5B:
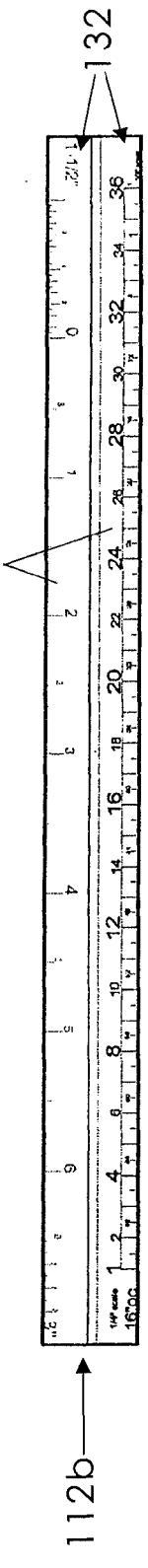
FIG. 5b is another top view of the measuring device as in FIG. 1a oriented to illustrate use of another particular font size.
Figure 5C:
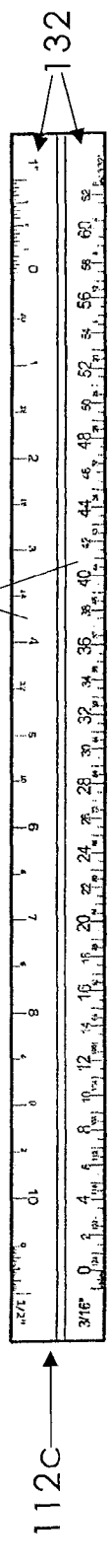
FIG. 5c is another top view of the measuring device as in FIG. 1a oriented to illustrate use of still another particular font size.
Figure 6:
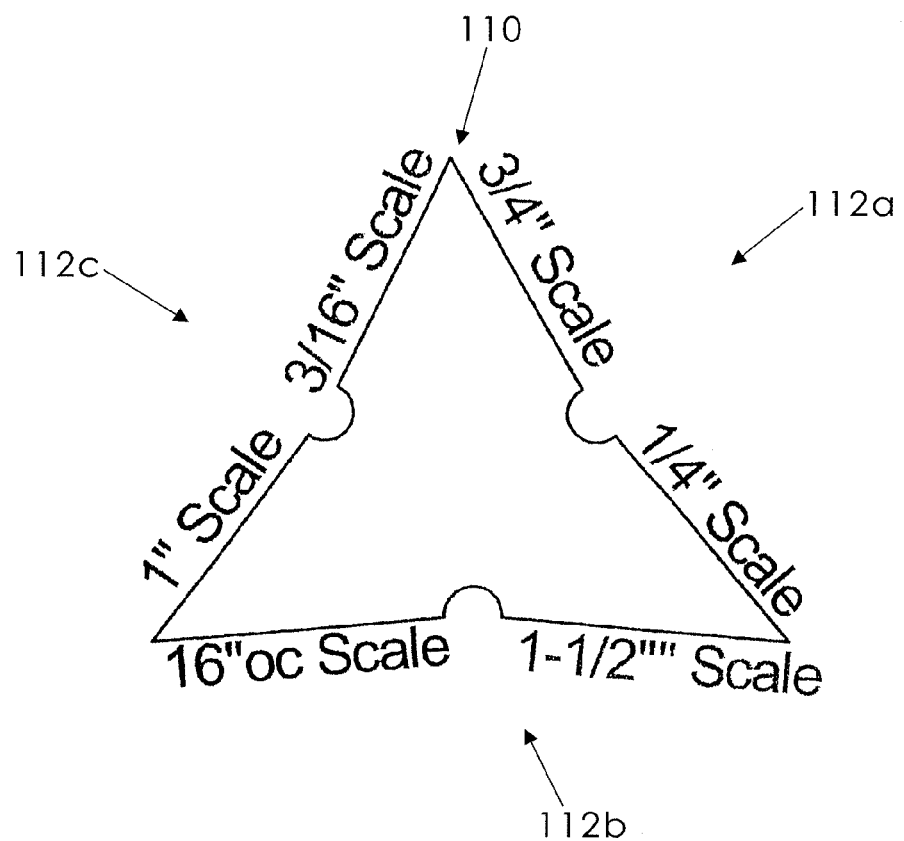
FIG. 6 is a schematic end view of one embodiment of the present invention illustrating the preferred positions of different scaled indicia.

Turning to the scaled indicia 132, a plurality of strips 130 (FIGS. 1a, 1b, and 3) are included, and each strip 130 has a length of scaled indicia 132 that is different from scaled indicia 132 of every other strip 130. There are at least as many strips 130 as there are channels 116, or in other words, the quantity of the strips 130 is at least as great as the quantity of all of the channels 116. A respective strip 130 is removably positioned (FIG. 1b) in each of the channels 116 such that each side 112 has two strips 130 offset 180 degrees away from each other, as shown in FIGS. 5a through 5c. By positioning the strips 130 away from—instead of toward—each other, the scaled indicia 132 of each strip 130 is upright when viewed from the outer edge 115a/115b closest the strip 130 toward the strip 130. Because of the transparency of the sides 112, the strips 130 (and particularly the lengths of scaled indicia 132) in the channels 116 may be viewed.

The scaled indicia 132 includes scaled markings and alphanumeric characters for relating lengths to predetermined dimensions. It should be appreciated that different types of scaled indicia 132 may be included, and that the scaled indicia 132 may be positioned in numerous manners (i.e., such that the sides 112 may include different combinations of the scaled indicia 132). In one currently preferred embodiment of a measuring device 100 with three sides 112, one side 112a (FIGS. 5a and 6) includes a ¼" scale and a ¾" scale, another side 112b (FIGS. 5b and 6) includes a 16"oc scale and a 1½" scale, and yet another side 112c (FIGS. 5c and 6) includes a ³⁄₁₆" scale and a 1" scale; the scaled indicia 132 is positioned (FIG. 6) such that rotating the measuring device 100 once from using the ¼" scale provides access to the 16"oc scale, and rotating again provides access to the ³⁄₁₆" scale; and that rotating once from using the ¾" scale provides access to the 1½" scale, and rotating again provides access to the 1" scale.

The scaled indicia 132 of at least one of the strips 130 may have a color different from a color of the scaled indicia 132 of at least one other strip 130, and it may be preferable for the scaled indicia 132 of each strip 130 to have a color different from a color of the scaled indicia 132 of every other strip 130. For example, the color of the ¼" scale may be red, the 16"oc scale may be black, the ³⁄₁₆" scale may be green, the ¾" scale may be blue, the 1" scale may be purple, and the 1½" scale may be orange. As shown in FIGS. 5a through 5c, the scaled indicia 132 of at least one of the strips 130 may include font of at least two different sizes. For example, the ¼" scale may have larger fonts for 0, 4, 8, 12, 16, 20, etc. to allow for improved readability of the measurement. In some embodiments, the scaled indicia 132 of all of the strips 130 includes font of at least two different sizes.

In use, the strips 130 may be positioned in the channels 116, such as described above. Especially by being removable, additional strips 130 may be included (so that there are more strips 130 than channels 116), and the user may determine which strips 130 to use. Further, the user may position the strips 130 in the manner that is personally most convenient. For example, the strips 130 used most frequently by the owner may be positioned to be accessible by simply rotating the measuring device 100. The user may utilize the color of the scaled indicia 132 to quickly identify the various scaled indicia 132, and the different sizes of font in the scaled indicia 132 may decrease eye strain. Because the strips 130 are positioned away from each other (as described above), the measuring device 100 is used by viewing the side 112 closest to the user (FIG. 4b) instead of viewing the side 112 furthest away from the user (FIG. 4a), as is required when scaled indicia is offset in the traditional manner of 180 degrees toward each other. This improved configuration may reduce strain and fatigue on the user. Nevertheless, it should be appreciated that a user could choose to install the strips 130 in the channels 116 such that the scaled indicia is offset toward each other in the traditional layout. By angling the portions 117a, 117b as described above, the scaled indicia 132 (or, more particularly, the portions of the sides 112 through which the scaled indicia 132 is viewed) does not touch the drafting or printed surface and does not get dirty. Further, the grooves 117c may visually separate the portions 117a, 117b from one another, and the strength of the sides 112 may be increased by interaction with the central axis 111.

Embodiment 200 (FIGS. 7a through 9) is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the described variations, for example. For uniformity and brevity, corresponding reference numbers may be used to indicate corresponding parts, though with any noted deviations.

Figure 7A:
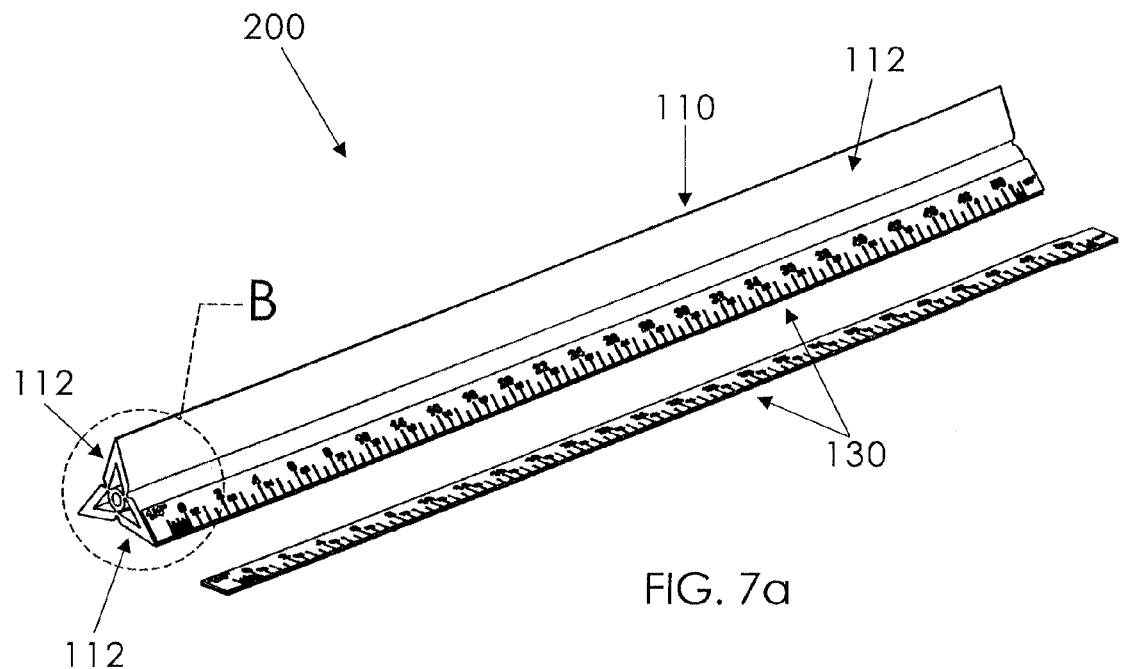
FIG. 7a is a perspective view of a measuring device according to another embodiment of the present invention.
Figure 7B:
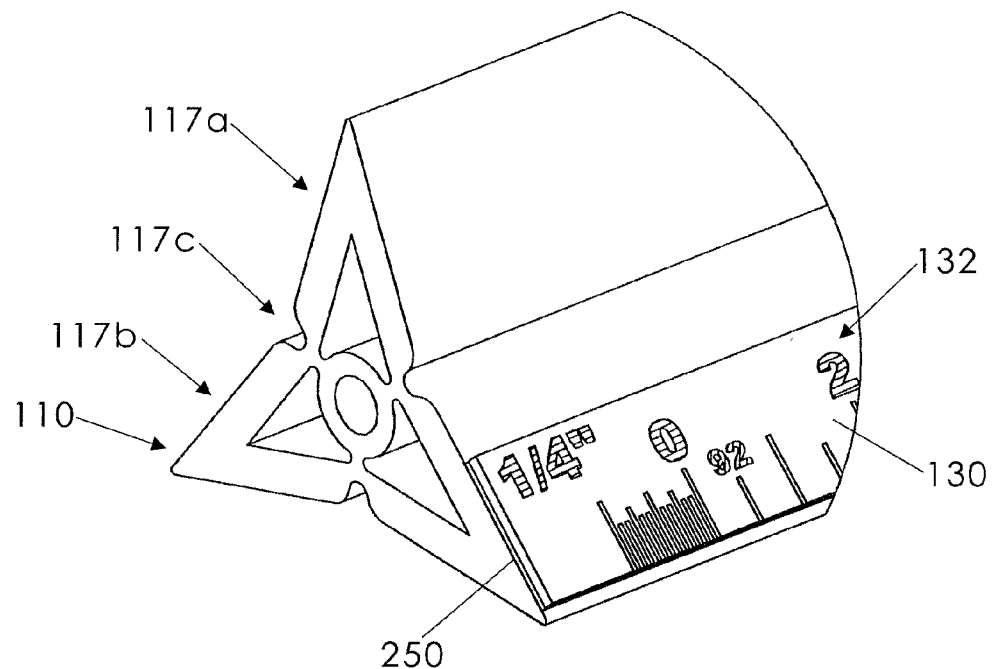

The measuring device 200 does not include channels 116, and the strips 130 are instead coupled to the outside of the sides 112 (FIG. 7b). Coupling elements 250 (FIG. 9) fix the strips 130 to the sides 112, in a permanent or removable manner. For example, the coupling elements 250 may adhere to the sides 112 and provide surfaces for hook and loop coupling to the strips 130. Or the coupling elements 250 may adhere the strips 130 to the sides 112.

If the strips 130 are removably coupled to the sides 112, many benefits of having strips 130 removably positioned in the channels 116 (in embodiment 100) may be realized; however, the strips 130 may be more protected when positioned in the channels 116—and thus, it may be particularly beneficial for a durable material (e.g., metal, etc.) to be used in embodiment 200 for the strips 130. Moreover, it may be necessary for the portions 117a, 117b to be more steeply angled in embodiment 200 to keep the scaled indicia 132 from touching the drafting or printed surface or getting dirty.

It is understood that while certain forms of this invention have been illustrated and described, it is not limited thereto except insofar as such limitations are included in the following claims and allowable functional equivalents thereof.

The invention claimed is:

1. A measuring device, comprising:
    at least three elongate sides, each side having first and second ends and a pair of outer edges extending therebetween, each side having a channel extending between said first and second ends at each outer edge; and
    a plurality of strips, the quantity of strips being at least as great as the quantity of all said channels, each strip having scaled indicia that is different from scaled indicia of every other strip, a respective strip removably positioned in each of said channels such that each side has two of said strips offset 180 degrees away from each other;

wherein each side is transparent to allow said scaled indicia of said strips in said channels to be viewed.

2. The measuring device of claim 1, wherein said sides are entirely constructed of transparent material.

3. The measuring device of claim 2, wherein:
an outer edge of each side is adjacent an outer edge of another respective side; and
each side has two portions separated by a groove and angled relative to one another such that said grooves are relatively adjacent a central axis extending between said sides.

4. The measuring device of claim 3, wherein said scaled indicia of at least one of said strips has a color different from a color of said scaled indicia of every other strip.

5. The measuring device of claim 4, wherein said scaled indicia of at least one of said strips includes font of at least two different sizes.

6. The measuring device of claim 3, wherein said scaled indicia of each strip has a color different from a color of said scaled indicia of every other strip.

7. The measuring device of claim 6, wherein said scaled indicia of each strip includes font of at least two different sizes.

8. The measuring device of claim 1, wherein said scaled indicia of at least one of said strips has a color different from a color of said scaled indicia of every other strip.

9. The measuring device of claim 1, wherein said scaled indicia of at least one of said strips includes font of at least two different sizes.

10. The measuring device of claim 1, wherein an outer edge of each side is adjacent an outer edge of another respective side.

11. The measuring device of claim 1, wherein each side has two portions separated by a groove and angled relative to one another such that said grooves are relatively adjacent a central axis extending between said sides.

12. The measuring device of claim 1, wherein:
an outer edge of each side is adjacent an outer edge of another respective side; and
each side has two portions separated by a groove and angled relative to one another such that said grooves are relatively adjacent a central axis extending between said sides.

13. The measuring device of claim 12, wherein:
said scaled indicia of at least one of said strips has a color different from a color of said scaled indicia of every other strip; and
said scaled indicia of at least one of said strips includes font of at least two different sizes.

14. A measuring device, comprising:
at least three elongate sides, each side having first and second ends and a pair of outer edges extending therebetween; and
a length of scaled indicia adjacent each outer edge such that each side has two lengths of scaled indicia offset 180 degrees away from each other, each length of scaled indicia having a scale different from a scale of each other length of scaled indicia.

15. The measuring device of claim 14, wherein each side includes at least one channel, and wherein said lengths of scaled indicia are positioned in said channels.

16. The measuring device of claim 14, wherein adhesive couples said lengths of scaled indicia to said sides.

17. A measuring device, comprising:
a unitary transparent housing having a central axis, first and second ends, and at least three elongate sides spaced about and touching said central axis; each side having a pair of outer edges extending between said first and second ends; an outer edge of each side being adjacent an outer edge of another respective side; each side having two portions angled inwardly toward said central axis; each side having a channel extending from said first end toward said second end adjacent each outer edge; and
a plurality of strips; the quantity of strips being at least as great as the quantity of all said channels; each strip having scaled indicia that is different from scaled indicia of every other strip; a respective strip removably positioned in each of said channels such that each side has two of said strips offset 180 degrees from each other; said scaled indicia of each strip being upright when viewed from said outer edge closest said strip toward said strip.

18. The measuring device of claim 17, wherein:
said scaled indicia of at least one of said strips has a color different from a color of said scaled indicia of every other strip; and
said scaled indicia of at least one of said strips includes font of at least two different sizes.

19. The measuring device of claim 17, wherein said scaled indicia of each strip has a color different from a color of said scaled indicia of every other strip.

\* \* \* \* \*